(12) United States Patent
Labbé et al.

(10) Patent No.: US 7,175,388 B2
(45) Date of Patent: Feb. 13, 2007

(54) INTEGRATED LABYRINTH AND CARBON SEAL

(75) Inventors: Michel Labbé, Montréal (CA); Eugene Gekht, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 11/110,734

(22) Filed: Apr. 21, 2005

(65) Prior Publication Data

US 2006/0239816 A1 Oct. 26, 2006

(51) Int. Cl.
*F01D 11/02* (2006.01)
*F03B 11/00* (2006.01)

(52) U.S. Cl. .................... 415/174.5; 415/230
(58) Field of Classification Search ........... 415/170.1, 415/174.5, 230, 231
See application file for complete search history.

(56) References Cited

U.S. PATENT DOCUMENTS

| | | | |
|---|---|---|---|
| 2,948,555 A | 8/1960 | Wright | |
| 3,122,374 A * | 2/1964 | McGahan | 277/400 |
| 3,964,753 A | 6/1976 | Junker et al. | |
| 4,088,329 A | 5/1978 | Junker | |
| 4,142,731 A | 3/1979 | Filippov et al. | |
| 4,257,617 A | 3/1981 | Hill | |
| 4,406,466 A | 9/1983 | Geary, Jr. | |
| 4,491,331 A | 1/1985 | Salant et al. | |
| 4,749,199 A * | 6/1988 | Gresh | 277/362 |
| 5,174,584 A | 12/1992 | Lahrman | |
| 5,498,007 A | 3/1996 | Kulkarni et al. | |
| 5,501,470 A | 3/1996 | Fuse et al. | |
| 5,527,045 A * | 6/1996 | Pondelick et al. | 277/422 |
| 5,934,683 A | 8/1999 | Sieghartner | |
| 6,142,729 A | 11/2000 | Tran et al. | |
| 6,330,790 B1 * | 12/2001 | Arora et al. | 60/39.08 |
| 6,446,976 B1 | 9/2002 | Key et al. | |

* cited by examiner

*Primary Examiner*—Hoang Nguyen
(74) *Attorney, Agent, or Firm*—Ogilvy Renault LLP

(57) ABSTRACT

An integrated double seal assembly includes a carbon seal ring and at least one annular labyrinth seal fin. The seal provides a compact solution for sealing a rotating shaft.

19 Claims, 2 Drawing Sheets

INTEGRATED LABYRINTH AND CARBON SEAL

TECHNICAL FIELD

The invention relates generally to seals for rotating elements and, more particularly, to an improved shaft seal for use in a gas turbine engine.

BACKGROUND OF THE ART

Controlled gap carbon seals and multiple-tooth labyrinth seals are but two distinct and independent seals which exist and which are used to provide fluid seals around rotating shafts, particularly those in high temperature environments such as in gas turbine engines. In certain applications, double seals are employed, in which two seals, such as a double carbon seal for example, are disposed side-by-side.

Controlled gap carbon seals provide relatively good sealing capabilities due to the relatively small clearances which can be maintained between the carbon ring seal and an inner runner, such as a rotating shaft of a gas turbine engine for example. Such tight shaft clearances are possible due to the ability of the carbon ring seal to radially "float" relatively to the rotating shaft, which eliminates any possible eccentricity of the rotating shaft.

Multiple-tooth labyrinth seals are commonly employed for sealing rotating shafts in gas turbine engines due to their sealing effectiveness. However, labyrinth seals are more affected by shaft eccentricities and thermal expansion, and therefore are less effective at maintaining a small gap between the shaft and the seal structure.

Accordingly, an improved shaft seal is sought.

SUMMARY OF THE INVENTION

It is therefore an object of this invention to provide an improved shaft seal, particularly one for use in a gas turbine engine.

In one aspect, the present invention provides an integrated double seal assembly for sealing a rotatable shaft having an outer circumferential surface and a longitudinal axis of rotation, the integrated seal assembly comprising a static outer housing supporting a first annular sealing member and a second annular sealing member disposed axially adjacent said first sealing member, said first sealing member having an annular carbon seal ring for mounting about an outer surface of said seal runner, the carbon seal ring being operable to be radially displaced such that a radial gap between the outer surface and an inner circumferential surface of the carbon seal ring is controlled, and said second sealing member having at least one annular labyrinth seal fin projecting towards said outer surface, said annular labyrinth seal fin being rotationally fixed to said outer housing.

In another aspect, the present invention provides a shaft double seal assembly adapted for sealing a rotatable shaft having a circumferential outer shaft surface and a longitudinal axis of rotation, the double shaft seal assembly comprising: a static outer housing mounted about the shaft; an annular carbon seal disposed within the static outer housing such that a controlled radial gap between the outer shaft surface and an internal circumferential surface of a carbon seal ring is provided, the carbon seal ring being constrained for movement in a radial direction within the housing to maintain the radial gap, a shrink band having a thermal expansion coefficient different from that of the carbon seal ring being engaged about an outer circumferential surface thereof, the shrink band maintaining the carbon seal in compression therewithin; and an annular labyrinth seal disposed axially adjacent said annular carbon seal, said annular labyrinth seal having at least one annular labyrinth fin rotatably fixed to said static outer housing and extending therefrom towards said outer shaft surface to provide a seal therewith when the double shaft seal assembly is disposed in place around the rotatable shaft.

In another aspect, the present invention provides a gas turbine engine comprising a compressor, a combustor and a turbine, said compressor and said turbine being interconnected by at least one engine shaft rotatable about a longitudinal axis thereof and having a circumferential outer shaft surface, a double seal assembly being disposed about the engine shaft between a first and a second engine cavity, the double seal assembly providing fluid sealing between said first and second engine cavities and including a carbon seal and a labyrinth seal integrated within a common static outer housing, the labyrinth seal having at least one annular labyrinth fin projecting from the static outer housing towards the outer shaft surface and being rotatable fixed to said static outer housing.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
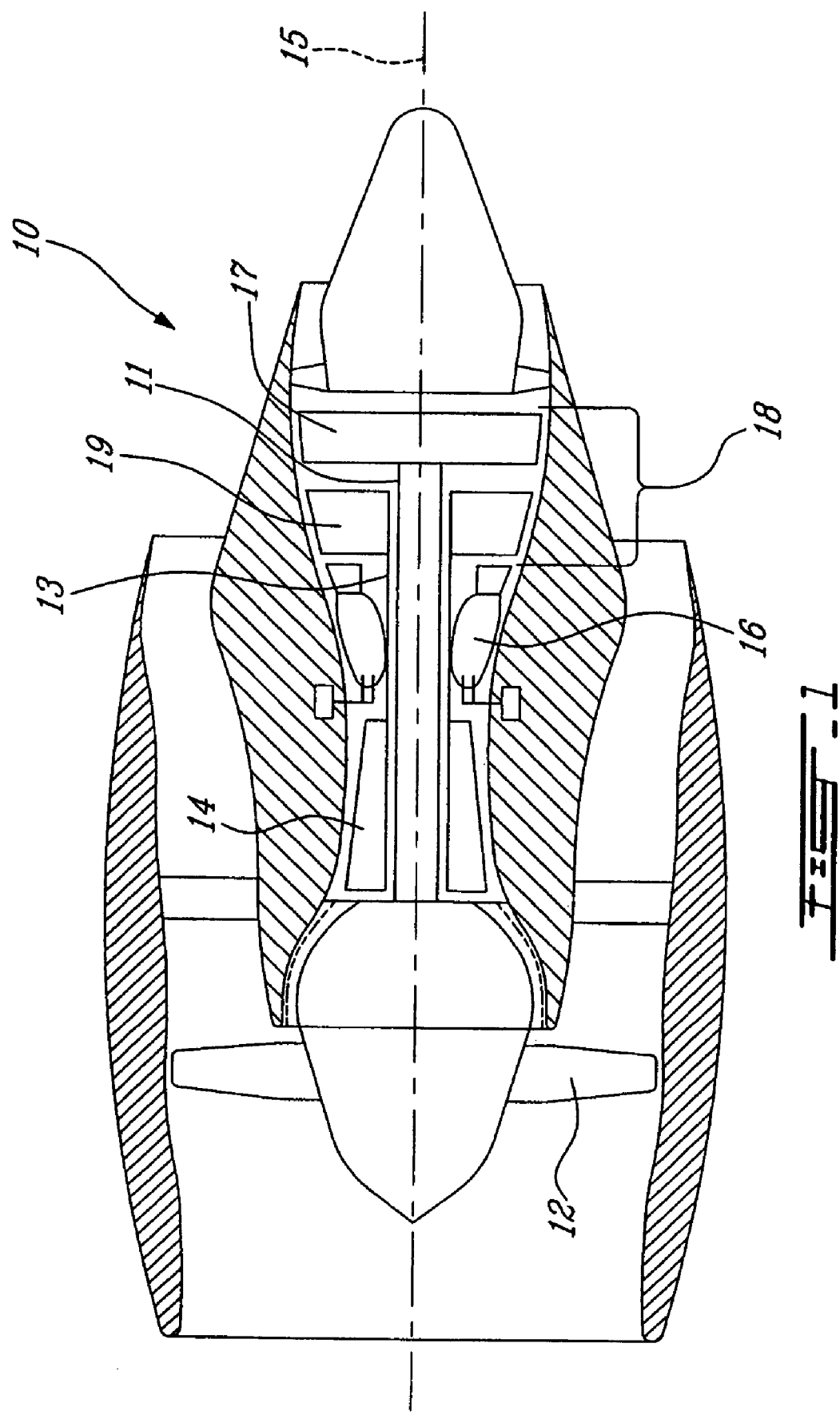
FIG. 1 is schematic cross-section of a typical gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The turbine section 18 comprises a low pressure turbine 17 and a high pressure turbine 19. The engine 10 also preferably includes at least two rotatable main engine shafts, namely a first inner shaft 11 interconnecting the fan 12 with the low pressure turbine 17, and a second outer shaft 13 interconnecting the compressor 14 with the high pressure turbine 19. The inner and outer main engine shafts 11 and 13 are concentric and rotate about the centerline axis 15 which is preferably collinear with their longitudinal axes.

The main engine shafts 11, 13 are supported at a plurality of points by bearings, and extend through several engine cavities. As such, shaft seals are provided to ensure sealing about the shafts at several points along their length to prevent unwanted fluid leaking from one engine compartment or cavity. For example, compressed air in the main engine gas path must be kept separate from the secondary cooling air or bearing lubrication oil in bearing cavities and cooling cavities adjacent to the main engine gas path. Various types of shaft seals are known for such a purpose.

The shaft double seal assembly provided by the present invention provides an improved shaft seal for these, and other shaft sealing purposes. The present invention provides particularly a shaft double seal assembly having an integrated controlled gap carbon seal and a labyrinth seal, the double seal assembly being relative small such that it can fit within small space envelopes and is particularly useful in applications wherein the axial space available about a rotating shaft is limited. As a result of the compact nature of the present shaft double seal assembly, considerable savings in space, weight and cost are thus provided. While described herein with reference generally to its use as shaft seal in a gas turbine engine, is also applicable to any other fluid sealing arrangement about a rotating shaft. For example only, high speed pumps and compressors used in high speed, temperature and/or severe service conditions represent other applications in which the present rotating shaft seal may prove viable.

Figure 2:
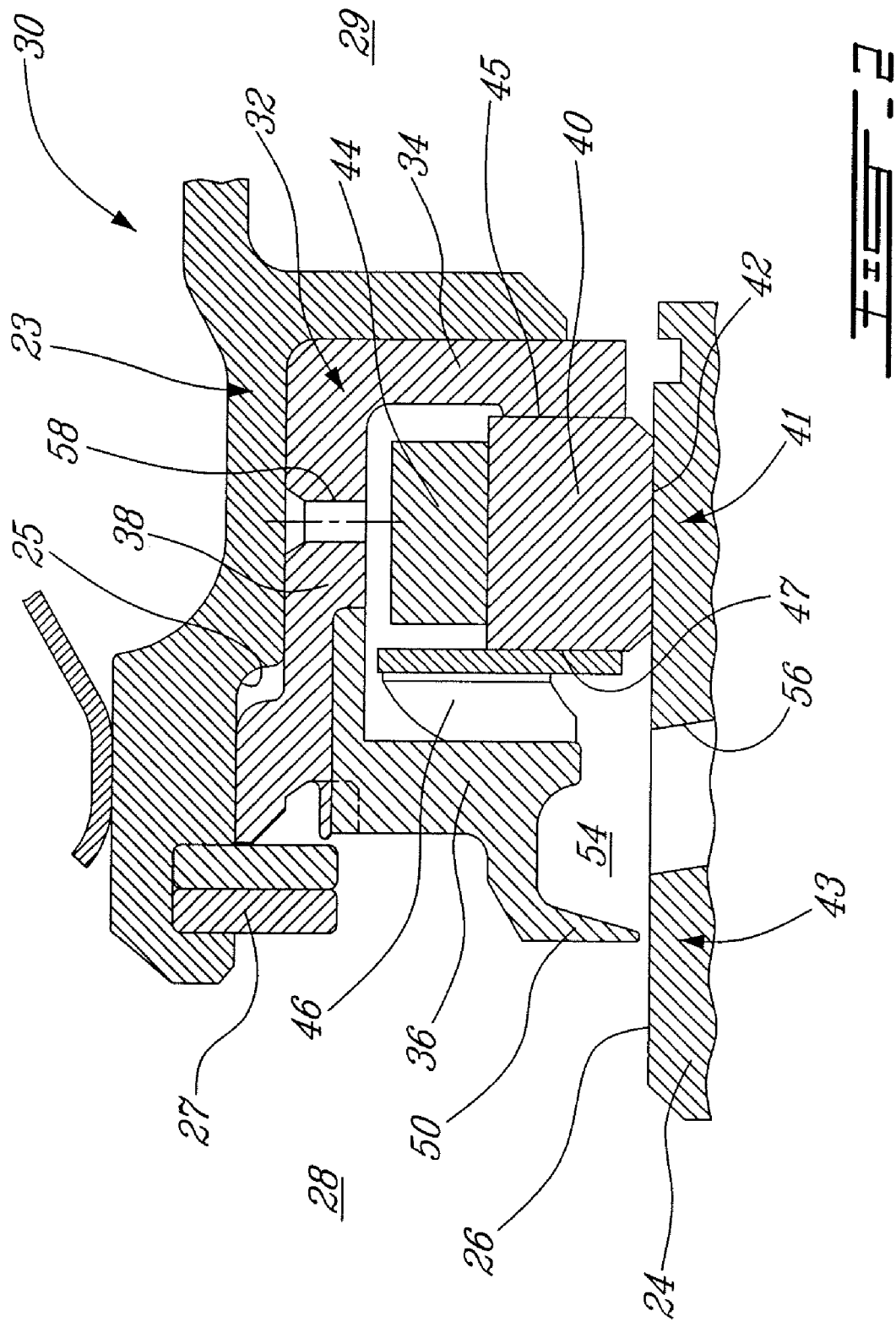
FIG. 2 is a partial cross-sectional view of an integrated shaft seal in accordance with the present invention.

When used in a gas turbine engine 10 such as that depicted in FIG. 1, the double seal assembly 30 of the present invention may be disposed about any rotating shaft or other element thereof, such as for example about at least one of the main engine shafts 11 and 13. Alternately, the double seal assembly 30 may be employed to seal another rotating shaft in the gas turbine engine 10 or in another turbomachine, pump, compressor, turbocharger or the like. Regardless, the rotatable shaft will include portion thereof which acts as a seal runner 24, preferably integrally formed therewith. The seal runner may extends radially outward from the main body of the rotating shaft to be sealed, or alternately the seal runner maybe be provided directly on the outer surface of the shaft itself. As seen in FIG. 2, the seal runner 24 defines thereon a radial outer surface 26 against which the integrated seal assembly 30 acts to provide a fluid seal between a first cavity or passage 28 and a second cavity or passage 29. In at least one gas turbine engine embodiment, the double seal assembly 30 provides a seal about a high speed rotating engine shaft such that fluid flow communication between a main gas flow passage on one side of the seal, such as the first cavity 28, and a bearing cavity on the other, such as the second cavity 29. Thus, the double seal assembly 30, which will be described below in greater detail, provides a fluid seal with the rotating circumferential outer surface 26 of a shaft's seal runner 24.

As seen in FIG. 2, the double seal assembly 30 includes generally a carbon seal 41 and a labyrinth seal 43 integrated within a common, static outer housing 32. The outer housing 32 of the double seal assembly 30 is located in place within a recess 25 defined in the fixed support structure 23, and retained therein by retaining ring members 27. The outer housing is also rotationally fixed within the support structure 23, such that it is immobile relative thereto. The outer housing 32 includes an upstream radially extending wall 36, a downstream radially extending wall 34, and an axially extending wall outer wall section 38 which links the two radial wall sections. Thus, the outer housing 32 forms a partially U-shaped housing which opens towards the outer circumferential surface 26 of the seal runner 24. Within the outer housing 32 retains a carbon sealing ring 40 which is provided about the seal runner 24 such that an inner circumferential surface 42 of the carbon sealing ring 40 opposes the seal runner outer surface 26 to define a controlled annular, radial gap therebetween. The carbon sealing ring 40 is substantially free-floating, such that it is radially displaceable by fluid dynamic forces generated by fluid passing through the annular gap, to thereby maintain a controlled radial gap distance. The carbon sealing ring 40 comprises a radially extending downstream face 45 which abuts the inner surface of the downstream housing wall 34, and is biased thereagainst by a biasing member 46 such as a spring which acts on the radially extending upstream face 47 of the carbon sealing ring 40. The carbon ring 40 is therefore radially displaceable, ie: it can radially "float", such that a relatively narrow annular gap between the inner circumferential surface 42 of the carbon sealing ring 40 and the outer surface 26 of the seal runner 24 can be maintained. Thus, eccentricity in the shaft can be accommodated without causing undue loss of sealing capabilities. An outer shrink band 44, which is preferably metallic, is also provided about the carbon sealing ring 40 to control the thermal growth of the carbon ring, thus maintaining a relatively constant gap throughout the operating temperature range of the system.

The inner circumferential surface 42 of the carbon sealing ring 40 defines a seal land area having an axial land distance. Due to the compact nature of the double seal assembly 30, this axial land distance is preferably between about 25% and about 50% of the total axial length of the double seal assembly 30, defined between the outermost surfaces of the upstream and downstream radially extending walls 36 and 38 of the outer housing 32.

The radially extending upstream wall 36 of the static outer housing 32 includes at least one annular labyrinth sealing fin or tooth 50 fixed thereto. Preferably, the annular labyrinth fin 50 is integrally formed with the upstream wall 36 of the outer housing 32, however the labyrinth fin 50 is at least rotationally fixed thereto, such that the labyrinth fin 50 is stationary and projects from the outer housing 32 towards the outer surface 26 of the seal runner 24, forming a labyrinth-type fluid seal therewith. Although only a single labyrinth fin 50 is depicted, two or more labyrinth seal fins may be provided.

Preferably, the radial distance defined between a tip of the annular labyrinth fin 50 and the rotating outer surface 26 of the seal runner 24 is generally similar to the radial gap defined between the inner circumferential surface 42 of the floating carbon sealing ring 40 and the rotating outer surface 26, however the radial clearance gap of the labyrinth fin is typically slightly larger. As the labyrinth seal 43 is preferably not floating (i.e. is not radially displaceable such that a clearance gap between the fin 50 and the runner surface 26 is maintained), the clearance gap between the tip of the labyrinth fin 50 and the runner surface 26 is generally slightly larger than that of the carbon seal 41 in order to be able to accommodate any radial movement or deflection of the shaft.

Thus, the double seal assembly 30 provides both a labyrinth seal 43 and a controlled gap carbon seal 41, both of which are integrated into a single common outer housing 32, such that the total amount of spaced required for the seal assembly is minimized. Particularly, the double seal assembly 30 requires only limited axial space, while providing a double fluid seal about the rotating shaft of the gas turbine engine 10. On very small gas turbine engines where space, especially axial space, is even more at a premium than in larger gas turbine engines, the reduced amount of axial space required for the double seal assembly 30 in comparison with two separate labyrinth and carbon seals, is a major advantage. Other seal designs, such as ones in which the labyrinth sealing fins rotate and are defined on the rotating seal runner for example, require significantly more axial space and additionally care must be taken to ensure that the rotating labyrinth fins are not too close to an adjacent carbon seal. The double seal assembly 30 of the present invention avoids these disadvantages, at least by locating the labyrinth fin or fins 50 on the common static outer housing 32 within which the carbon seal 41 is enclosed. Integrating the labyrinth fin(s) 50 into the outer housing of the seal assembly therefore minimizes space required for the seal and further is more economical to produce that two individual seals or known double seals.

Preferably, the labyrinth fin 50 of the labyrinth seal 43 and the carbon sealing ring 40 of the carbon seal 41 are axially spaced apart such that a cavity 54 is defined therebetween about the rotating seal runner 24, within the enclosed outer housing 32 of the double seal assembly 30. The cavity 54 may be pressurized by secondary air provided via air passage 56 defined in the seal runner, such that the pressurized cavity 54 acts as a buffer cavity to provide an additional fluid sealing feature to the seal assembly 30. Smaller holes 58 defined in the outer wall section 38 of the housing permit pressurized air from the cavity 54 to be fed to a small groove circumscribing the outer diameter of the housing 32 to provide a seal between the housing 23 and the surrounding support structure 23. Thus, the holes 58 help prevent leakage which could arise around the housing 32 from scratches or irregularities in the fit between the outer diameter of the housing 32 and the surrounding support structure 23. By pressurizing the buffer cavity 54 with secondary air at a pressure greater than that on either side of the double seal assembly 30, improved sealing capabilities are provided to the already efficient sealing abilities of the double seal assembly 30.

In the embodiment depicted in FIG. 2, the integrated double seal assembly 30 is disposed about a rotating main engine shaft 20, between the main gas turbine engine gas passage 28 and a secondary bearing cavity 29 within which lubrication fluid is retained. The carbon seal portion 41 of the double seal assembly 30 is adjacent the bearing cavity 29 and therefore acts as a bearing cavity seal, and the upstream labyrinth seal portion 43 of the double seal assembly 30 provides a buffer seal on the opposite side of the pressurized buffer cavity 54.

The above description is meant to be exemplary only, and one skilled in the art will recognize that changes may be made to the embodiments described without department from the scope of the invention disclosed. For example, although the carbon sealing ring 40 is so named, it is to be understood that this sealing ring can be composed of other suitable materials, or composition of materials, which are suitable for the operating environment of the application and which may or may not include carbon. Further, although the labyrinth seal portion of the double seal assembly is depicted having a single labyrinth fin, two or more such sealing fins or teeth may be provided. Preferably, the labyrinth seal portion is separate from the outer housing and is assembled with and engaged thereto by a fastening means such as swaging, crimping, welding, etc. The labyrinth seal portion may be integrally formed with the common outer static housing of the double seal assembly, however this typically poses difficulties for subsequently engaging the carbon seal portion with this assembly. Thus, the labyrinth seal fin is preferably not integrally formed therewith unless the carbon seal portion is so designed such that it can be mounted into the housing in segments or in another manner which will permits the assembly formed by the integral labyrinth fin and housing. Modifications may also be made to the specific structure of the controlled gap carbon seal, particularly with respect to the shrink band and the biasing member. Additionally, as noted above, the seal runner may an integral part of the outer surface of the rotating shaft or rather a radially projecting portion fixed thereto. Although the double seal assembly has been preferably described with the labyrinth seal portion upstream from the carbon seal portion thereof relative to a main gas flow through an engine passage, it is to be understood that the double seal assembly may be inverted such that the carbon seal portion is disposed upstream relative to the labyrinth seal portion. Still other modifications which fall within the scope of the present invention will be apparent to those skilled in the art, in light of a review of this disclosure, and such modifications are intended to fall within the appended claims.

The invention claimed is:

1. An integrated double seal assembly for sealing a rotatable shaft having a circumferential seal runner and a longitudinal axis of rotation, the integrated seal assembly comprising a static outer housing supporting a first annular sealing member and a second annular sealing member disposed axially adjacent said first sealing member, said first sealing member having an annular carbon seal ring for mounting about an outer surface of said seal runner, the carbon seal ring being operable to be radially displaced such that a radial gap between the outer surface and an inner circumferential surface of the carbon seal ring is controlled to provide a first radial seal therebetween, and said second sealing member having at least one annular labyrinth seal fin projecting towards said outer surface to provide a second radial seal therebetween, said annular labyrinth seal fin being rotationally fixed to said outer housing, and said static outer housing includes an outer annular portion axially extending between first and second radially extending walls thereof which inwardly project towards said outer surface of said seal runner, an axial distance between outer surfaces of said first and second radially extending walls defining a total axial length of said seal assembly, said first sealing member being located proximate said first radially extending wall and second sealing member being located proximate said second radially extending wall.

2. The double seal assembly as defined in claim 1, wherein one of said first and second radially extending walls has said annular labyrinth fin engaged therewith.

3. The double seal assembly as defined in claim 1, wherein said labyrinth seal fin is disposed upstream relative to said carbon seal ring within said static outer housing.

4. The double seal assembly as defined in claim 1, wherein said first and second sealing members are axially spaced apart to define a cavity therebetween, said cavity being enclosed within said static outer housing.

5. The double seal assembly as defined in claim 4, wherein said cavity is in fluid flow communication with a source of secondary air such that said cavity is pressurized by said secondary air to provide a sealing air buffer between said first and second sealing members.

6. The double seal assembly as defined in claim 1, wherein said first and second radially extending walls are respectively downstream and upstream radially extending walls.

7. The double seal assembly as defined in claim 1, wherein said seal runner is integrally formed with said rotatable shaft.

8. The double seal assembly as defined in claim 7, wherein said seal runner is radially outwardly spaced from said rotatable shaft.

9. The double seal assembly as defined in claim 2, wherein said inner circumferential surface of the carbon seal ring defines a land area having an axial land distance of between about 25% and about 50% of the total axial length of said seal assembly.

10. A shaft double seal assembly adapted for sealing a rotatable shaft having a circumferential outer shaft surface and a longitudinal axis of rotation, the double shaft seal assembly comprising:
- a static outer housing mounted about the shaft, said static outer housing including an outer annular portion axially extending between first and second radially extending walls thereof which inwardly project towards said circumferential outer shaft surface, an axial distance between said first and second radially extending walls defining a total axial length of said seal assembly;
- an annular carbon seal disposed within the static outer housing adjacent the first radially extending wall thereof such that a controlled radial gap between the outer shaft surface and an internal circumferential surface of a carbon seal ring is provided to create a first radial seal therebetween, the carbon seal ring being constrained for movement in a radial direction within the housing to maintain the radial gap, a shrink band having a thermal expansion coefficient different from that of the carbon seal ring being engaged about an outer circumferential surface thereof, the shrink band maintaining the carbon seal in compression therewithin; and
- an annular labyrinth seal disposed axially adjacent said second radially extending wall of the static outer housing, said annular labyrinth seal having at least one annular labyrinth fin rotatably fixed to said static outer housing and extending therefrom towards said outer shaft surface to provide a second radial seal therewith when the double shaft seal assembly is disposed in place around the rotatable shaft.

11. The shaft double seal assembly as defined in claim 10, wherein said at least one annular labyrinth fin is disposed upstream relative to said carbon seal ring.

12. The shaft double seal assembly as defined in claim 10, wherein said at least one annular labyrinth fin and said carbon seal ring are axially spaced apart to define a cavity therebetween, said cavity being enclosed within said static outer housing.

13. The shaft double seal assembly as defined in claim 12, wherein said cavity is in fluid flow communication with a source of secondary air such that said cavity is pressurized by said secondary air to provide a sealing air buffer between said at least one annular labyrinth fin and said carbon seal ring.

14. A gas turbine engine comprising a compressor, a combustor and a turbine, said compressor and said turbine being interconnected by at least one engine shaft rotatable about a longitudinal axis thereof and having a circumferential outer shaft surface, a double seal assembly being disposed about the engine shaft between a first and a second engine cavity, the double seal assembly providing fluid sealing between said first and second engine cavities and including a carbon seal and a labyrinth seal integrated within a common static outer housing having first and second radially extending walls defining the axial length of the double seal assembly therebetween, the labyrinth seal having at least one annular labyrinth fin projecting from the static outer housing towards the outer shaft surface and being rotatable fixed to said static outer housing, the carbon seal being located adjacent the first radially extending wall and including a carbon seal ring radially displaceable to control a radial gap between the outer circumferential shaft surface and an inner circumferential surface of the carbon seal ring to provide a first radial seal therebetween, and the labyrinth seal being located adjacent the second radially extending wall and providing a second radial seal between the at least one labyrinth fin and the outer circumferential shaft surface.

15. The gas turbine engine as defined in claim 14, wherein said first engine cavity is a main engine gas path and said second engine cavity is an internal engine cavity containing one of secondary air and lubrication fluid.

16. The gas turbine engine as defined in claim 15, wherein said internal engine cavity is a bearing cavity containing at least one bearing therein.

17. The gas turbine engine as defined in claim 16, wherein said carbon seal is disposed adjacent said bearing cavity to act as a bearing cavity seal, and said labyrinth seal is disposed adjacent said main engine cavity.

18. The gas turbine engine as defined in claims 14, wherein said annular labyrinth fin and said carbon seal are axially spaced apart to define a seal cavity therebetween, said seal cavity being enclosed within said common static outer housing.

19. The gas turbine engine as defined in claim 18, wherein said seal cavity is in fluid flow communication with a source of secondary air such that said seal cavity is pressurized by said secondary air to provide a sealing air buffer between said carbon seal and said labyrinth seal.

* * * * *